(12) United States Patent
Kapil et al.

(10) Patent No.: US 12,738,974 B2
(45) Date of Patent: Sep. 15, 2026

(54) CAN TRANSMITTER CIRCUIT WITH CURRENT SMOOTHING

(71) Applicant: Texas Instruments Incorporated, Dallas, TX (US)

(72) Inventors: Jitender Kapil, Bangalore (IN); Akshay Sanadhya, Bangalore (IN); Lokesh Kumar Gupta, Bangalore (IN); Shishir Goyal, Bangalore (IN); Deep Banerjee, Bangalore (IN); Atul Kumar Singh, Mau (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 19/043,311

(22) Filed: Jan. 31, 2025

(65) Prior Publication Data

US 2026/0066944 A1 Mar. 5, 2026

(30) Foreign Application Priority Data

Aug. 28, 2024 (IN) ............................ 202441064913

(51) Int. Cl.
*H04L 27/00* (2006.01)
*H04B 1/04* (2006.01)
*H04B 3/03* (2006.01)

(52) U.S. Cl.
CPC ................ *H04B 3/03* (2013.01); *H04B 1/04* (2013.01)

(58) Field of Classification Search
CPC ........................................................ H04B 3/03
USPC ........................................ 375/295, 219, 316
See application file for complete search history.

(56) References Cited

U.S. PATENT DOCUMENTS 10,802,517 B1 * 10/2020 Assaad .................. G05F 1/468

* cited by examiner

*Primary Examiner* — Zewdu A Kassa
(74) *Attorney, Agent, or Firm* — Xianghui Huang; Frank D. Cimino

(57) ABSTRACT

In described examples, a device includes a bias voltage circuit, an output circuit, and multiple current source circuits. A first plurality of the current source circuits is coupled between a first output of the bias voltage circuit and a first input of the output circuit. A second plurality of the current source circuits is coupled between a second output of the bias voltage circuit and a second input of the output circuit. Each of the current source circuits includes first and second resistors, first and second switches, and a transistor. The first switch is coupled between a gate of the transistor and the bias voltage circuit. The second switch is coupled between the gate of the transistor and a first terminal of the transistor. The second terminal of the transistor is coupled to the output circuit.

20 Claims, 9 Drawing Sheets

104
236-N
236-1
248-N
248-1
102
TO 106
250
252
I_H
I_L
MP5-N
MN5-N
MP5-1
MN5-1
Rdschg_HN
234-N
226-N
SWb_HN
232-N
SW_HN
228-N
Rchg_HN
230-N
SW_LN
240-N
238-N
Rdschg_LN
246-N
244-N
SWb_LN
Rchg_LN
242-N
Vcc
222
Rdschg_H1
234-1
226-1
SWb_H1
232-1
SW_H1
228-1
Rchg_H1
230-1
CONTROL CIRCUIT
110
GND
224
SW_L1
240-1
238-1
246-1
Rdschg_L1
244-1
SWb_L1
Rchg_L1
242-1
BIAS_P
213
FROM 102
BIAS_N
219
FROM 102

CAN TRANSMITTER CIRCUIT WITH CURRENT SMOOTHING

CROSS-REFERENCE TO RELATED APPLICATIONS

This application claims the benefit of, and priority to, India Provisional Application No. 202441064913, filed Aug. 28, 2024, which is incorporated herein by reference.

TECHNICAL FIELD

This application relates generally to controller area network (CAN) systems, and more particularly to CAN transmitter circuits for driving CAN high and low bus lines.

BACKGROUND

The CAN standard was developed to enable efficient communication between electronic components in a vehicle, such as electronic control units (ECUs). CAN systems are used to communicate data and instructions between components in various applications, such as automotive and industrial applications. The CAN standard specifies differential signaling. Differential signaling can be used to transmit signals with reduced noise and increased signal magnitude headroom.

SUMMARY

In described examples, a device includes a bias voltage circuit, an output circuit, and multiple current source circuits. A first plurality of the current source circuits is coupled between a first output of the bias voltage circuit and a first input of the output circuit. A second plurality of the current source circuits is coupled between a second output of the bias voltage circuit and a second input of the output circuit. Each of the current source circuits includes first and second resistors, first and second switches, and a transistor. The first switch is coupled between a gate of the transistor and the bias voltage circuit. The second switch is coupled between the gate of the transistor and a first terminal of the transistor. The second terminal of the transistor is coupled to the output circuit.

In described examples, a device includes a bias voltage circuit, an output circuit, multiple current source circuits, and first, second, third, fourth, fifth, and sixth transistors. The current source circuits are coupled between the bias voltage circuit and the output circuit. A first terminal of the third transistor is coupled to a first terminal of the first transistor. A control terminal of the third transistor is coupled to a control terminal and a second terminal of the first transistor and a control terminal and a first terminal of the second transistor. Second terminals of the second and fifth transistors are coupled. First terminals of the fourth and sixth transistors are coupled. Second terminals of the third and sixth transistors are coupled to the output circuit. A control terminal of the sixth transistor is coupled to a control terminal and a second terminal of the fourth transistor and to a control terminal and a first terminal of the fifth transistor.

DETAILED DESCRIPTION

Figure 1:
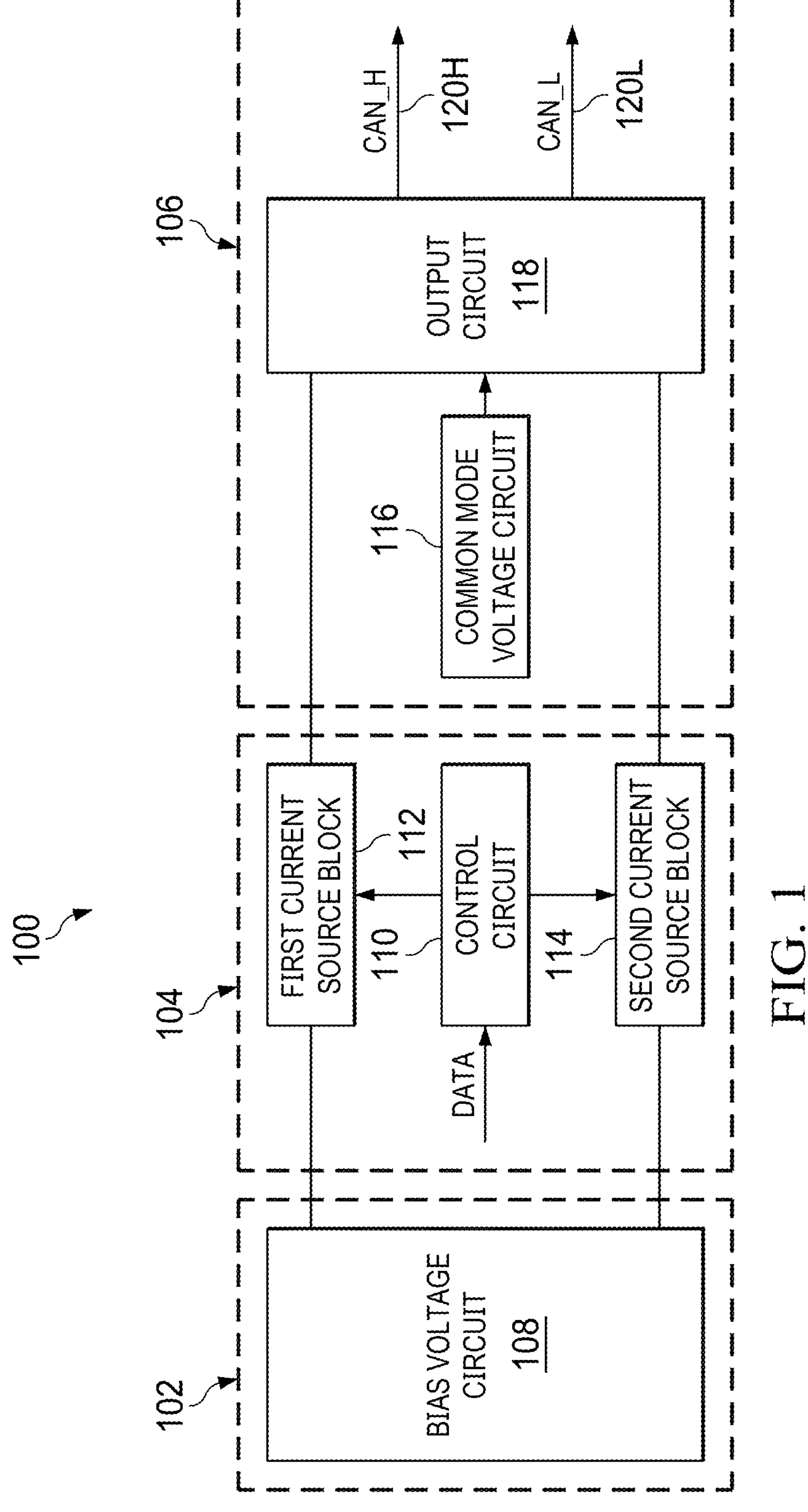
FIG. 1 is a functional block diagram of a CAN transmitter.

A CAN transmitter controls voltages on a CAN bus to transmit a signal. A CAN bus is a differential bus, and accordingly includes a high CAN bus line and a low CAN bus line. A first state of the CAN bus, such as a state corresponding to transmission of a logic one, is referred to as a recessive (REC) state. The REC state corresponds to the high and low CAN bus lines having a same voltage that is equal to one half of a supply voltage, such as 2.5 volts. The REC state voltage equals a common mode voltage (Vcm). A second state of the CAN bus, such as a state corresponding to transmission of a logic zero, is referred to as a dominant (DOM) state. The DOM state corresponds to the high and low CAN bus lines having different voltages that are symmetric around Vcm, for example, 3.25 volts (a high voltage) and 1.75 volts (a low voltage). A data value transmitted by the CAN bus corresponds to a differential voltage of the CAN bus line, accordingly, a voltage of the high CAN bus line minus a voltage of the low CAN bus line. In the described example, this differential voltage is zero volts in the REC state and 1.5 volts in the DOM state.

When a CAN transmitter receives a DATA value corresponding to the DOM state, the high CAN bus line is pulled up to the high voltage and the low CAN bus line is pulled down to the low voltage. When a CAN transmitter receives a DATA value corresponding to the REC state, the high CAN bus line is released (for example, decoupled from) the high voltage and the low CAN bus line is released from the low voltage, so that the high and low CAN bus lines return to Vcm. In some examples, the high and low CAN bus lines are pulled back to Vcm.

If the voltages of the high and low CAN bus lines are not symmetrical around Vcm, including during transitions between the DOM state and the REC state, electromagnetic frequency (EMF) radiation may be emitted. Some or all of certain conditions can be applied to transitions of the CAN transmitter from a DOM state to a REC state, and from a REC state to a DOM state: (1) Change over time in current values provided to and sunk from the CAN bus has a linear slope. And/or (2) change over time in resistance from the high CAN bus line to the power supply, and change over time in resistance from the low CAN bus line to ground, each respectively have linear slopes. Benefits provided by these conditions may include some or all of improving symmetry of the voltages of the high and low CAN bus lines around Vcm, and/or reducing EMF radiation emitted by the CAN transmitter. This is further described below with respect to the figures.

Metal-oxide-semiconductor field-effect transistors (MOSFETS) are numbered as M[channel type][number], where the number increases for each differing transistor of a same channel type. Channel types include n-channel MOSFETS (NMOS) and p-channel MOSFETS (PMOS). The channel type for each transistor is only an example, and other examples may substitute another transistor of a different type for any illustrated transistor. Also, the same reference numbers or other reference designators are used in the drawings to designate features that are related structurally and/or functionally.

Herein, some structures or signals that are distinct but related have reference numbers that use a [number][dash][number] format, such as MP5-1 226-1 and MN5-3 238-3. Some structures that affect signals on the high CAN bus line and low CAN bus line are indicated, respectively, by an [underscore][H or L] (H for high, L for low), such as Rchg_H 230 and SW_L 240. In some examples, these numbering conventions are combined to indicate particular high CAN bus line side or low CAN bus line side structures, such as Rchg_1H 230-1 and SW_2L 240-2. In some examples, these structures or signals are referred to generally, in the singular or as a group, using the [number] or the [underscore][H or L] and [number] and without the [dash][number], such as MP5 226 or Rchg_H 230.

Also, the same reference numbers or other reference designators are used in the drawings to designate features that are related structurally and/or functionally.

FIG. 1 is a functional block diagram of a CAN transmitter 100. The CAN transmitter 100 includes a bias voltage stage 102, an output control stage 104, and an output stage 106. The bias voltage stage 102 includes a bias voltage circuit 108. The output control stage 104 includes a control circuit 110, a first current source block 112, and a second current source block 114. The output stage 106 includes a common mode voltage circuit 116, an output circuit 118, and a CAN bus 120. The CAN bus 120 includes a high CAN bus line (CAN_H) 120H and a low CAN bus line (CAN_L) 120L.

A first output of the bias voltage circuit 108 provides a first bias voltage, such as a bias voltage for p-channel MOSFETS, to a first input of the first current source block 112. A second output of the bias voltage circuit 108 provides a second bias voltage, such as a bias voltage for n-channel MOSFETS, to a first input of the second current source block 114.

An input of the control circuit 110 receives a DATA signal corresponding to a DATA value to be transmitted by CAN transmitter 100 over the CAN bus 120. A first output of the control circuit 110 provides a first control signal to a second (control) input of the first current source block 112. A second output of the control circuit 110 provides a second control signal to a second (control) input of the second current source block 114. An output of the first current source block 112 provides a first current to a first input of the output circuit 118. The first current is responsive to the first control signal. An output of the second current source block 114 provides a second current to a second input of the output circuit 118. The second current is responsive to the second control signal.

An output of the common mode voltage circuit 116 provides a common mode voltage to a third input of the output circuit 118. The common mode voltage sets a REC signal voltage of the CAN bus 120, accordingly, a voltage of CAN_H 120H and of CAN_L 120L while the output circuit 118 transmits a REC signal over the CAN bus 120. A first output of the output circuit 118 provides a third current to CAN_H 120H. A second output of the output circuit 118 provides a fourth current to CAN_L 120L. The third current is responsive to the first current, and the fourth current is responsive to the second current. A first state of the third and fourth currents corresponds to a REC signal, and a second state of the third and fourth currents corresponds to a DOM signal.

Figure 2A:
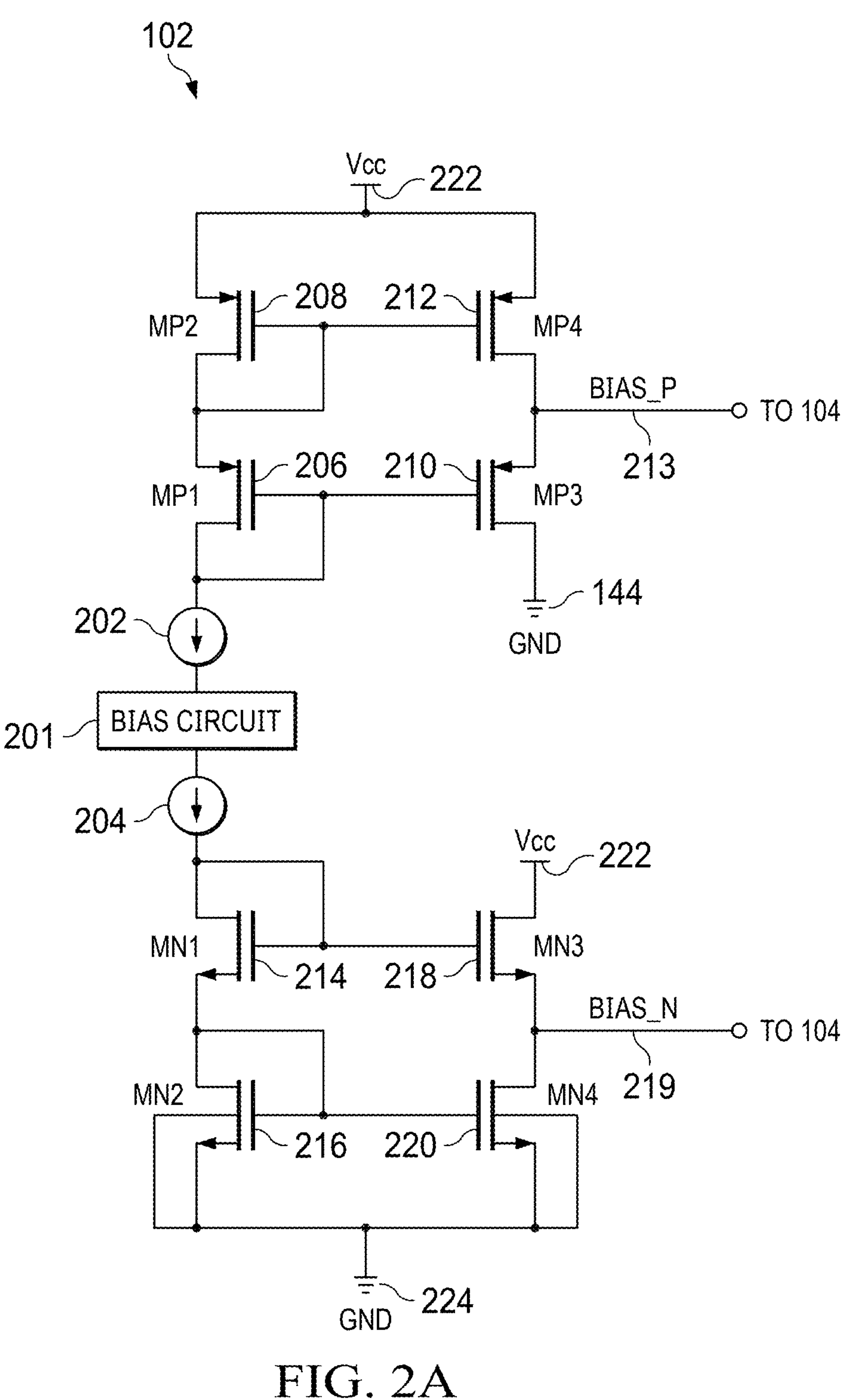
FIG. 2A is a functional block and circuit diagram of bias voltage circuit of FIG. 1.

The bias voltage stage 102 is further described with respect to FIG. 2A. The output control stage 104 is further described with respect to FIG. 2B. The output stage 106 is further described with respect to FIG. 2C. Together, FIGS. 2A, 2B, and 2C correspond to an example implementation of the CAN transmitter 100.

FIG. 2A is a functional block and circuit diagram of the bias voltage circuit 108 of FIG. 1. The bias voltage circuit 108 includes a bias circuit 201, a first current source 202, a second current source 204, a first p-channel MOSFET (MP1) 206, a second p-channel MOSFET (MP2) 208, a third p-channel MOSFET (MP3) 210, a fourth p-channel MOSFET (MP4) 212, a first n-channel MOSFET (MN1) 214, a second n-channel MOSFET (MN2) 216, a third n-channel MOSFET (MN3) 218, a fourth n-channel MOSFET (MN4) 220, a voltage source (Vcc) 222, and a ground terminal (GND) 224. The bias circuit 201 controls (and/or provides) currents respectively provided by the first current source 202 and the second current source 204.

A first terminal of the bias circuit 201 is coupled to a second terminal of the first current source 202. A first terminal of the first current source 202 is coupled to a gate and drain of MP1 206 and a gate of MP3 210. A drain of MP3 210 is coupled to the ground terminal 224. A source of MP1 206 is coupled to a gate and drain of MP2 208 and a gate of MP4 212. Sources of MP2 208 and MP4 212 are coupled to Vcc 222. A source of MP3 210 and a drain of MP4 212 are coupled to a first bias voltage terminal 213.

A second terminal of the bias circuit 201 is coupled to a first terminal of the second current source 204. A second terminal of the second current source 204 is coupled to a gate and drain of MN1 214 and a gate of MN3 218. A drain of MN3 218 is coupled to Vcc 222. A source of MN1 214 is coupled to a gate and drain of MN2 216 and a gate of MN4 220. Sources and back-gates (bulk terminals) of MN2 216 and MN4 220 are coupled to the ground terminal 224. A source of MN3 218 and a drain of MN4 220 are coupled to a second bias voltage terminal 219.

Current provided by the first current source 202 pulls down the voltages at the gates of p-channel MOSFETS MP1 206, MP2 208, MP3 210, and MP4 212, so that MP1 206, MP2 208, MP3 210, and MP4 212 turn on (activate/conduct). In an example, pulling down gate voltages discharges gate-source capacitances of said MOSFETS. While MP1 206 and MP2 208 are turned on, the current provided by the first current source 202 flows through source-drain paths of MP1 206 and MP2 208.

Diode-connected MP1 206 forms a first current mirror with MP3 210. Diode-connected MP2 208 forms a second current mirror with MP4 212. Accordingly, while MP1 206, MP2 208, MP3 210, and MP4 212 are turned on, the current flowing through the source-drain paths of MP1 206 and MP2 208 is reflected through the source-drain paths of MP3 210 and MP4 212. Current through the source-drain path of MP3 210 is responsive to a multiplier of the first current mirror (MP1 206 and MP3 210). Current through the source-drain path of MP4 212 is responsive to a multiplier of the second current mirror (MP2 208 and MP4 212). A bias voltage BIAS_P at the first bias voltage terminal 213 is determined responsive to current through MP3 210 and current through MP4 212. BIAS_P is provided to the first current source block 112.

Current provided by the second current source 204 pulls up the voltages at the gates of n-channel MOSFETS MN1 214, MN2 216, MN3 218, and MN4 220, so that MN1 214, MN2 216, MN3 218, and MN4 220 turn on. In an example, pulling up gate voltages charges gate-source capacitances of said MOSFETS. While MN1 214 and MN2 216 are turned on, the current provided by the second current source 204 flows through drain-source paths of MN1 214 and MN2 216.

Diode-connected MN1 214 forms a third current mirror with MN3 218. Diode-connected MN2 216 forms a fourth current mirror with MP4 220. Accordingly, while MN1 214, MN2 216, MN3 218, and MN4 220 are turned on, the current flowing through the source-drain paths of MN1 214 and MN2 216 is reflected through the source-drain paths of MN3 218 and MN4 220. Current through the source-drain path of MN3 218 is responsive to a multiplier of the first current mirror (MN1 214 and MN3 218). Current through the source-drain path of MN4 220 is responsive to a multiplier of the second current mirror (MN2 216 and MN4 220). A bias voltage BIAS_N at the second bias voltage terminal 219 is determined responsive to current through MN3 218 and current through MN4 220. BIAS_N is provided to the second current source block 114.

Figure 2B:
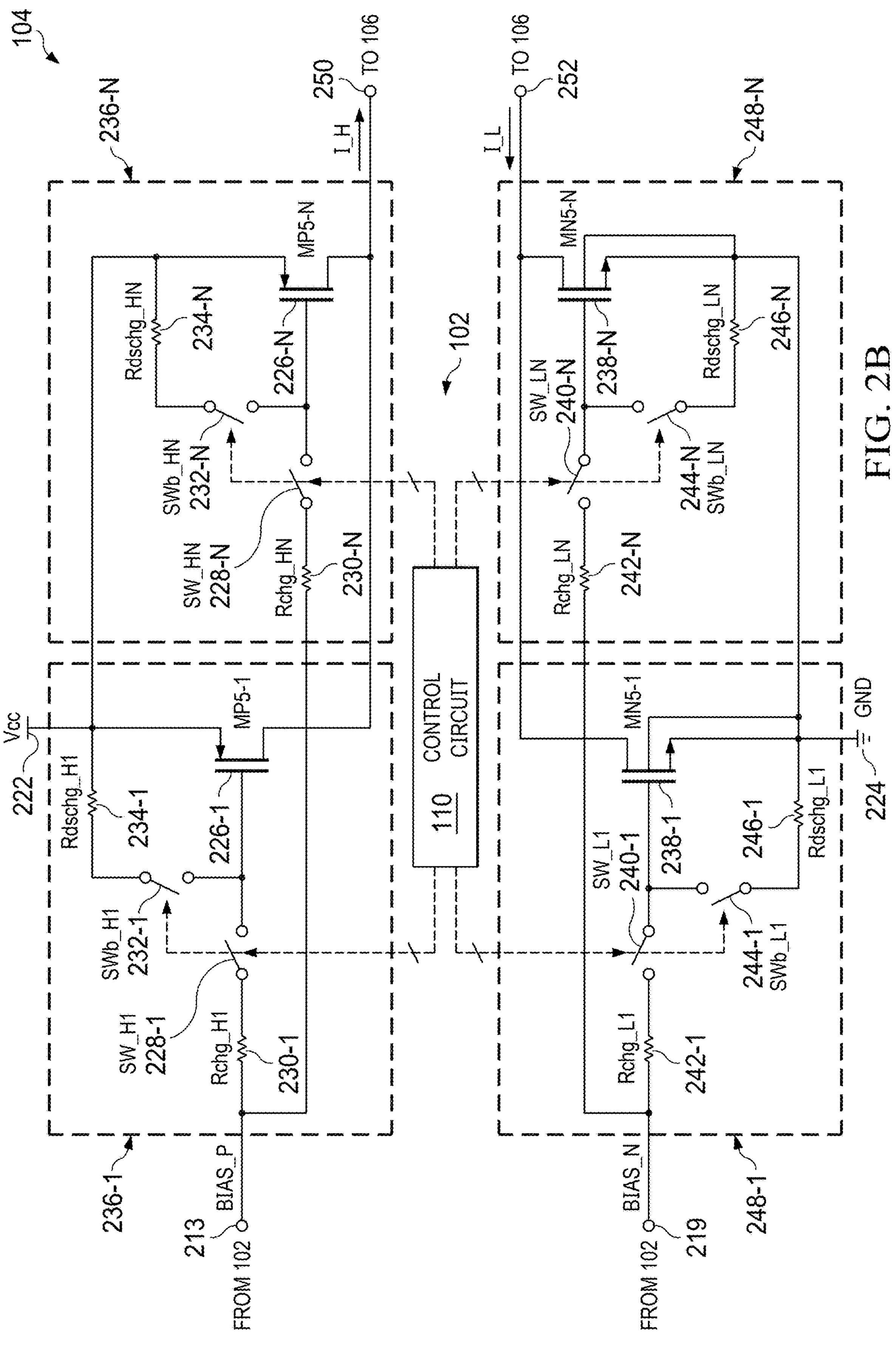
FIG. 2B is a functional block and circuit diagram of the output control stage of FIG. 1.

FIG. 2B is a functional block and circuit diagram of the output control stage 104 of FIG. 1. Initially, a summary of function of the output control stage 104 of FIG. 2B is provided.

High-side components of the output control stage 104, pictured above the control circuit 110 in FIG. 2B, control current (I_H) sourced to CAN_H 120H. Low-side components of the output control stage 104, pictured below the control circuit 110 in FIG. 2B, control current (I_L) sunk from CAN_L 120L. The control circuit 110 controls turn-on and turn-off timing of high-side and low-side switches. Herein, a switch described as turned on refers to a switch that is closed, accordingly, conducting. A switch described as turned off refers to a switch that is open, accordingly, not conducting.

Recall that in some examples, a single reference number is used herein to refer to multiple similarly-situated devices, using the numbering form [reference number]-[number]. A total of N high-side fifth p-channel MOSFETS MP5 226-1 through 226-N source current to CAN_H 120H when turned on. Components corresponding to a particular current source MP5 226 are within the same dotted box (current source circuit 236) as the particular current source MP5 226. Respective high-side switches SW_H 228-1 through 228-N and high-side charging resistors Rchg_H 230-1 through 230-N control charging rates of gate-source capacitances of respective current sources MP5 226-1 through 226-N, accordingly, control turn-on rates of respective current sources MP5 226. High-side inverted switches SWb_H 232-1 through 232-N and high-side discharging resistors Rdschg_H 234-1 through 234-N control discharging rates of gate-source capacitances of respective current sources MP5 226-1 through 226-N, accordingly, control turn-off rates of respective current sources MP5 226-1 through 226-N. The control circuit 110 provides control signals so that either an SW_H 228, or its corresponding SWb_H 232, but not both, is on at a time. Together, a current source MP5 226, and its corresponding SW_H 228, Rchg_H 230, SWb_H 232, and Rdschg_H 234, are a current source circuit 236.

A total of N low-side fifth n-channel MOSFETS MN5 238-1 through 238-N sink current from CAN_L 120L when turned on. Components corresponding to a particular current sink MN5 238 are within the same dotted box (current sink circuit 248) as the particular current sink MN5 238. Low-side switches SW_L 240-1 through 240-N and low-side charging resistors Rchg_L 242-1 through 240-N control charging rates of gate-source capacitances of respective current sinks MN5 238-1 through 238-N, accordingly, control turn-on rates of respective current sinks MN5 238-1 through 238-N. Low-side inverted switches SWb_L 244-1 through 244-N and low-side discharging resistors Rdschg_L 246-1 through 246-N control discharging rates of gate-source capacitances of respective current sinks MN5 238-1 through 238-N, accordingly, control turn-off rates of respective current sinks MN5 238-1 through 238-N. The control circuit 110 provides control signals so that either an SW_L 240-1 through 240-N, or its corresponding SWb_L 244-1 through 244-N, but not both, is on at a time. Together, a current sink MN5 238-1 through 238-N, and its corresponding SW_L 240, Rchg_L 242, SWb_L 244, and Rdschg_L 246, are a current sink circuit 248.

The output control stage 104 of FIG. 2B is now further described. The output control stage 104 includes the control circuit 110, high side circuits, and low side circuits. The high side circuits include N MP5 226 (MP5-1 226-1 through MP5-N 226-N), N SW_H 228 (SW_H1 228-1 through SW_HN 228-N), N Rchg_H 230 (Rchg_H1 230-1 through Rchg_HN 230-N), N SWb_H 232 (SWb_H1 232-1 through SWb_HN 232-N), and N Rdschg_H 234 (Rdschg_H1 234-1 through Rdschg_HN 234-N), with the above transistors, switches, and resistors providing N current source circuits 236 (236-1 through 236-N). The low side circuits include N MN5 238 (MN5-1 238-1 through MN5-N 238-N), N SW_L 240 (SW_L1 240-1 through SW_LN 240-N), N Rchg_L 242 (Rchg_L1 242-1 through Rchg_LN 242-N), N SWb_L 244 (SWb_L1 244-1 through SWb_LN 244-N), and N Rdschg_L 246 (Rdschg_L1 246-1 through Rdschg_LN 246-N), with the above transistors, switches, and resistors providing N current sink circuits 248 (248-1 through 248-N).

SW_H 228, SW_L 240, SWb_H 232, and SWb_L 244 are collectively referred to herein as the switches.

Accordingly, for an index i that ranges from 1 to N, an $i^{th}$ current source circuit 236-*i* includes MP5-i 226-*i*, SW_Hi 228-*i*, Rchg_Hi 230-*i*, SWb_Hi 232-*i*, and Rdschg_Hi 234-*i*. An $i^{th}$ current sink circuit 248-*i* includes MN5-i 238-*i*, SW_Li 240-*i*, Rchg_Li 242-*i*, SWb_Li 244-*i*, and Rdschg_Li 246-*i*. The current source circuits 236 are coupled in parallel between the bias voltage circuit 108 and CAN_H 120H. The current sink circuits 248 are coupled in parallel between the bias voltage circuit 108 and CAN_L 120L.

In current source 236-*i*, a first terminal of Rchg_Hi 230-*i* is coupled to the first bias voltage terminal 213 and receives BIAS_P. A second terminal of Rchg_Hi 230-*i* is coupled to a first terminal of SW_Hi 228-*i*. A second terminal of SW_Hi 228-*i* is coupled to a gate of MP5-i 226-*i* and a first terminal of SWb_Hi 232-*i*. A second terminal of SWb_Hi 232-*i* is coupled to a first terminal of Rdschg_Hi 234-*i*. A second terminal of Rdschg_Hi 234-*i* and a source of MP5-i 226-*i* are coupled to Vcc 222. A drain of MP5-i 226-*i* is coupled to a first bus current terminal 250.

In current sink 248-*i*, a first terminal of Rchg_Li 242-*i* is coupled to the second bias voltage terminal 219 and receives BIAS_N. A second terminal of Rchg_Li 242-*i* is coupled to a first terminal of SW_Li 240-*i*. A second terminal of SW_Li 240-*i* is coupled to a gate of MN5-i 238-*i* and a first terminal of SWb_Li 244-*i*. A second terminal of SWb_Li 244-*i* is coupled to a first terminal of Rdschg_Li 246-*i*. A second terminal of Rdschg_Li 246-I, and a source and back-gate (bulk terminal) of MN5-i 238-*i* are coupled to the ground terminal 224. A drain of MN5-i 238-*i* is coupled to a second bus current terminal 252.

High-side control outputs of the control circuit 110 are coupled to control terminals of SW_H1 228-1 through SW_HN 228-N and SWb_H1 232-1 through SWb_HN 232-N. Low-side control outputs of the control circuit 110 are coupled to control terminals of SW_L1 240-1 through SW_LN 240-N and SWb_L1 244-1 through SWb_LN 244-N. The control signal provided to SW_Hi 228-*i* is the same as the control signal provided to SW_Li 240-*i*. The control signal provided to SWb_Hi 232-*i* is the same as the control signal provided to SWb_Li 240-*i*, and is the logical inverse (high instead of low, or low instead of high) of the control signals provided to SW_Hi 228-*i* and SW_Li 240-*i*. The control circuit 110 is further described with respect to FIG. 4.

When the control circuit 110 controls SW_Hi 228-*i* to close and SWb_Hi 232-*i* to open, the gate of MP5-i 226-*i* receives the signal BIAS_P via Rchg_Hi 230-*i*. Rchg_Hi 230-*i* and a gate-source capacitance of MP5-i 226-*i* are an RC circuit. The product of resistance Rchg_Hi 230-*i* and corresponding gate-source capacitance of MP5-i 226-*i* corresponds to an RC time constant. Accordingly, the gate-source capacitance of MP5-i 226-*i* charges to turn on MP5-i 226-*i* at a rate responsive to the resistance of Rchg_Hi 230-*i* and the gate-source capacitance of MP5-i 226-*i*.

Figure 5:
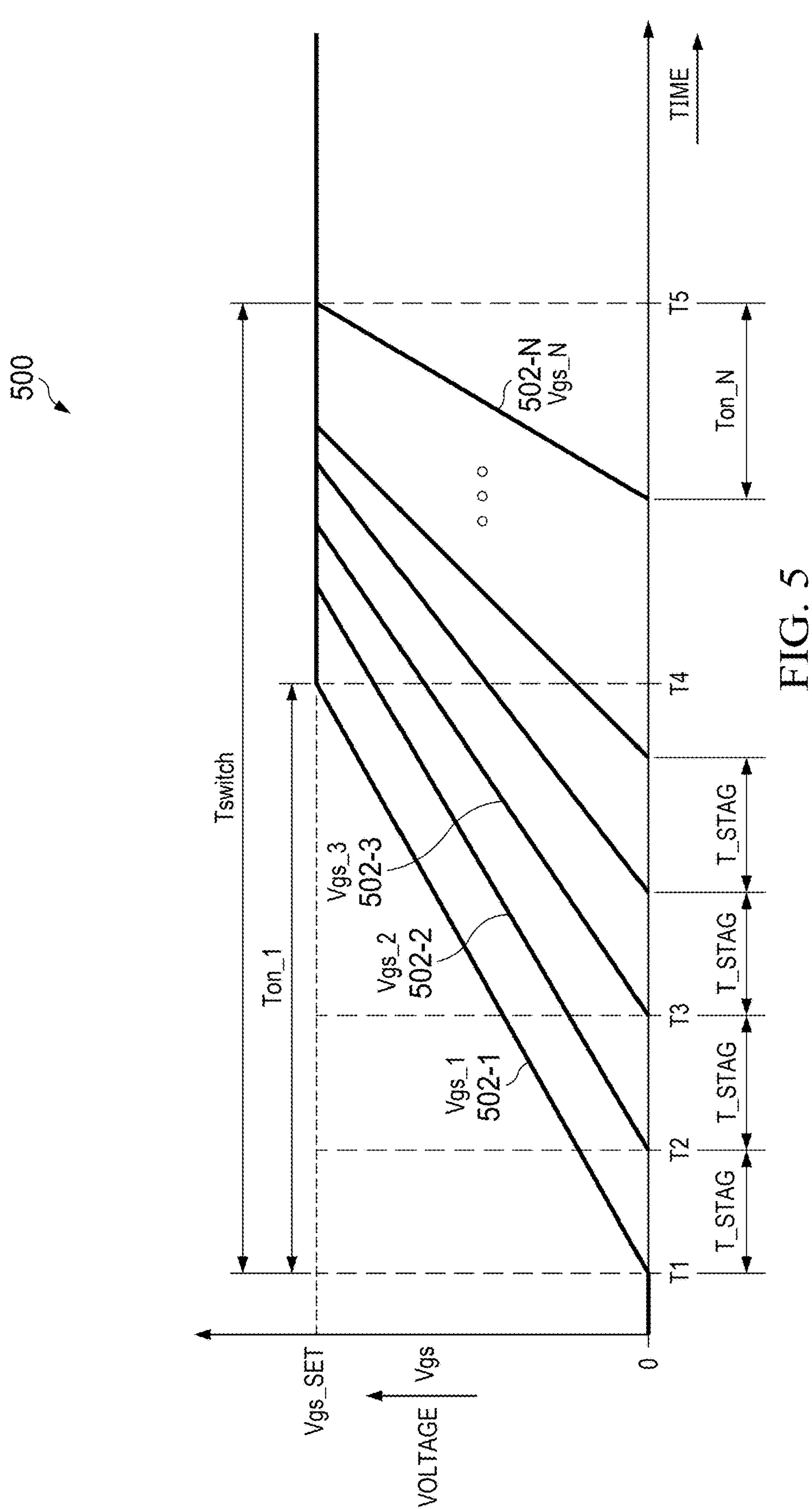
FIG. 5 is a graph of source-gate voltage or gate-source voltage against time for the current sources MP5 and current sinks MN5 (respectively) of FIG. 2B.

As further described with respect to FIG. 5, each MP5-i 226-*i* is turned on initially in the saturation region and then in the linear region. Each MP5-i 226-*i* is turned on according to the corresponding RC time constant. Initially, in the saturation region, turn-on and corresponding equivalent resistance decrease are relatively slow. This enables successive turn-ons of MN5-i 238-*i* (incrementing i) to be controlled to start at times so that total equivalent resistance of all of the MP5-i 226-*i* decreases linearly and voltage of CAN_H 120H correspondingly increases (is increasingly pulled up) linearly. As turn-on of the respective MP5-i 226-*i* progresses into the linear region, linear decrease of equivalent resistance continues according to the properties of linear region operation of a MOSFET.

When the control circuit 110 controls SW_Li 228-*i* to close and SWb_Li 232-*i* to open, the gate of MN5-i 238-*i* receives the signal BIAS_N via Rchg_Li 242-*i*. Rchg_Li 242-*i* and a gate-source capacitance of MN5-i 238-*i* are an RC circuit. The products of resistances Rchg_Hi 230-*i* and Rchg_Li 242-*i* and corresponding gate-source capacitances of MP5-i 226-*i* and MN5-i 238-*i* correspond to RC time constants. Accordingly, the gate-source capacitance of MN5-i 238-*i* charges to turn on MN5-i 238-*i* at a rate responsive to the resistance of Rchg_Li 242-*i* and the gate-source capacitance of MN5-i 238-*i*.

As further described with respect to FIG. 5, each MN5-i 238-*i* is turned on initially in the saturation region and then in the linear region. Each MN5-i 238-*i* is turned on according to the corresponding RC time constant. Initially, in the saturation region, turn-on and corresponding equivalent resistance decrease are relatively slow. This enables successive turn-ons of MN5-i 238-*i* (incrementing i) to be controlled to start at times so that total equivalent resistance of all of the MN5-i 238-*i* decreases linearly and voltage of CAN_L 120L correspondingly decreases (is increasingly pulled down) linearly. As turn-on of a respective MN5-i 238-*i* progresses into the linear region, linear decrease of equivalent resistance continues according to the properties of linear region operation of a MOSFET.

Delays provided by resistances Rchg_Hi 230-*i* and gate-source capacitances of MP5-i 226-*i*, and by resistances Rchg_Li 242-*i* and gate-source capacitances of MN5-i 238-*i*, are matched. MP5-i 226-*i* and MN5-i 238-*i* are also matched. Matched delays and matched high side and low side current control FETs enables rates of high-side and low-side resistance decrease to match. It also enables the rate of CAN_H 120H voltage increase (or decrease) to match the rate of CAN_L 120L voltage decrease (or increase, respectively).

In some examples, the various MP5 226-*i* and MN5 238 are designed so that their respective equivalent resistances during turn-on and turn-off fit into resistance curves facilitating linear resistance and voltage change over time as described. In some examples, the various MP5 226, MN5 238, Rchg_Hi 230, and Rchg_Li 242 components are designed to provide RC values, and corresponding delays, to facilitate linear change over time in resistance and voltage as described. In some examples, these design criteria are also responsive to a maximum allowed data switching time according to device specifications of the CAN transmitter 100.

When the control circuit 110 controls SWb_Hi 228-*i* to open and SWb_Hi 232-*i* to close, the gate of MP5-i 226-*i* is decoupled from BIAS_P and coupled to Vcc 222 via Rdschg_Hi 234-*i*. Rdschg_Hi 234-*i* and a gate-source capacitance of MP5-i 226-*i* are an RC circuit. Accordingly, the gate-source capacitance of MP5-i 226-*i* discharges to turn off MP5-i 226-*i* at a rate responsive to the resistance of Rdschg_Hi 234-*i* and the gate-source capacitance of MP5-i 226-*i*. Equivalent resistance of MP5-i 226-*i* increases linearly and voltage of CAN_H 120H correspondingly decreases (discharges) back to Vcm linearly.

When the control circuit 110 controls SW_Li 228-*i* to open and SWb_Li 232-*i* to close, the gate of MN5-i 238-*i* is decoupled from BIAS_N and is coupled to the ground terminal 224 via Rdschg_Li 246-*i*. Rdschg_Li 246-*i* and a gate-source capacitance of MN5-i 238-*i* are an RC circuit. Accordingly, the gate-source capacitance of MN5-i 238-*i* discharges to turn off MN5-i 238-*i* at a rate responsive to the resistance of Rdschg_Li 246-*i* and the gate-source capacitance of MN5-i 238-*i*. Equivalent resistance of MN5-i 238-*i* increases linearly and voltage of CAN_L 120L correspondingly increases (charges) back to Vcm linearly.

As described above, RC time constants corresponding to Rchg_Hi 230-*i* and MP5-i 226-*i* equal RC time constants corresponding to Rchg_Li 242-*i* and MN5-i 238-*i* (separately for each value of i). Also, MP5-i 226-*i* and MN5-i 238-*i* are matched. This enables a rate at which high-side resistance decreases while sequentially turning on current sources MP5 226 to equal a rate at which low-side resistance decreases while sequentially turning on current sources MP6 238. Similarly, RC time constants corresponding to Rdschg_Hi 234-*i* and MP5-i 226-*i* equal RC time constants corresponding to Rdschg_Li 246-*i* and MN5-i 238-*i* (separately for each value of i). This enables a rate at which high-side resistance increases while sequentially turning off current sources MP5 226 to equal a rate at which low-side resistance increases while turning off current sources MP6 238.

In some examples, RC time constants corresponding to Rchg_Hi 230-*i* and MP5-i 226-*i* equal RC time constants corresponding to Rdschg_Hi 234-*i* and MP5-i 226-*i* (separately for each value of i). Similarly, RC time constants corresponding to Rchg_Li 242-*i* and MN5-i 238-*i* equal RC time constants corresponding to Rdschg_Li 246-*i* and MN5-i 238-*i* (separately for each value of i). This enables a turn-off process for MP5 226 and MN5 238 to be performed similarly, in opposite order (i from N to 1 instead of from 1 to N), as a turn-on process.

Accordingly, a rate at which a high-side current provided by the first current source block 112 to CAN_H 120H changes is designed to equal a rate at which a low-side current provided by the second current source block 114 to CAN_L 120L changes. Also, currents provided by individual current source circuits 236, and sunk by individual current sink circuits 248, change gradually, rather than as a step function. This enables a rate of change (increase or decrease) of voltage on CAN_H 120H to more closely equal a rate of change of voltage on CAN_L 120L, without significant additional process or design area expense to reduce or eliminate mismatch between turn-on and turn-off times of corresponding high side and low side switches. It also enables the voltages on CAN_H 120H and CAN_L 120L to be more symmetrical around Vcm in response to variations in turn-on and turn-off timings of SW_H 228 and SW_L 240, and of SWb_H 232 and SWb_L 244.

Herein, the MP5 226 network refers to all of the MP5 226 cumulatively, and the MN5 238 network refers to all of the MN5 238 cumulatively.

As described above, the various Rchg_H 230 and Rchg_L 242 control respective current sources MP5 226 and current sinks MN5 238 to turn on at a rate that is approximately (accordingly, within design constraints) linear and responsive to the respective Rchg resistance values and MP5 226 and MN5 238 gate-source capacitance values. Similarly, the various Rdschg_H 234 and Rdschg_L 246 control respective current sources MP5 226 and current sinks MN5 238 to turn off at a rate that is approximately linear and responsive to the respective Rdschg resistance values and MP5 226 and MN5 238 gate-source capacitance values. Sequential, paired activation and deactivation of MP5 226 and MN5 238 to linearly decrease or increase resistance and, correspondingly, linearly increase or decrease voltage (respectively) seen by CAN_H 120H and CAN_L 120L enables some or all of various benefits.

Such benefits include improved resistance matching between the MP5 226 network and the MN5 238 network during MP5 226 and MN5 238 turn-on and turn-off, improved voltage matching between CAN_H 120H and CAN_L 120L during MP5 226 network and MN5 238 network turn-on and turn-off, reduced EMF radiation emitted by the CAN transmitter 100 responsive to improved voltage symmetry between CAN_H 120H and CAN_L 120L with respect to Vcm, and reduced device area cost. In some examples, device area cost is reduced by avoiding a need for trim bits to conform current sourced to CAN_H 120H to current sunk from CAN_L 120L during device turn-on. In some examples, timing and other parameter errors are caused by process, voltage, or temperature variation. In some examples, the described CAN transmitter 100, and corresponding benefits described herein, reduce EMF emissions corresponding to timing and other parameter errors, such as parameter errors corresponding to device mismatch.

In some examples, improved voltage and resistance matching during turn-on and turn-off is further improved because voltage and resistance change linearly during turn-on and turn-off. Accordingly, SW timing errors that are shorter than the time spacing between successive switch activations correspond to voltage or resistance mismatch seen by the CAN bus 120 that is less than the contribution of a single MP5 226 or MN5 238. Also, the smaller the timing error, the smaller the value of the voltage or resistance mismatch.

In a first illustrative example, a step change current is provided to CAN_H 120H (or CAN_L 120L), and the same step change current is provided to CAN_L 120L (or CAN_H 120H) with a first delay. Responsively, there is a first voltage mismatch between CAN_H 120H and CAN_L 120L corresponding to the step change current. The first voltage mismatch has a duration corresponding to the first delay.

In a second illustrative example, a linearly changing current has a slope (current over time). The linearly changing current is provided to CAN_H 120H, and the same linearly changing current is provided to CAN_L 120L with a second delay. Responsively, there is a second voltage mismatch between CAN_H 120H and CAN_L 120L corresponding to the slope of the linearly changing current times the second delay. If the magnitude of the step change current equals a maximum magnitude of the linearly changing current, then the second voltage mismatch is less than the first voltage mismatch. Accordingly, a proportional difference between the first and second voltage mismatches is responsive to the second delay multiplied by the slope of the linearly changing current.

Functionality of the output control stage 104 is further described with respect to FIGS. 4 through 7.

Figure 2C:
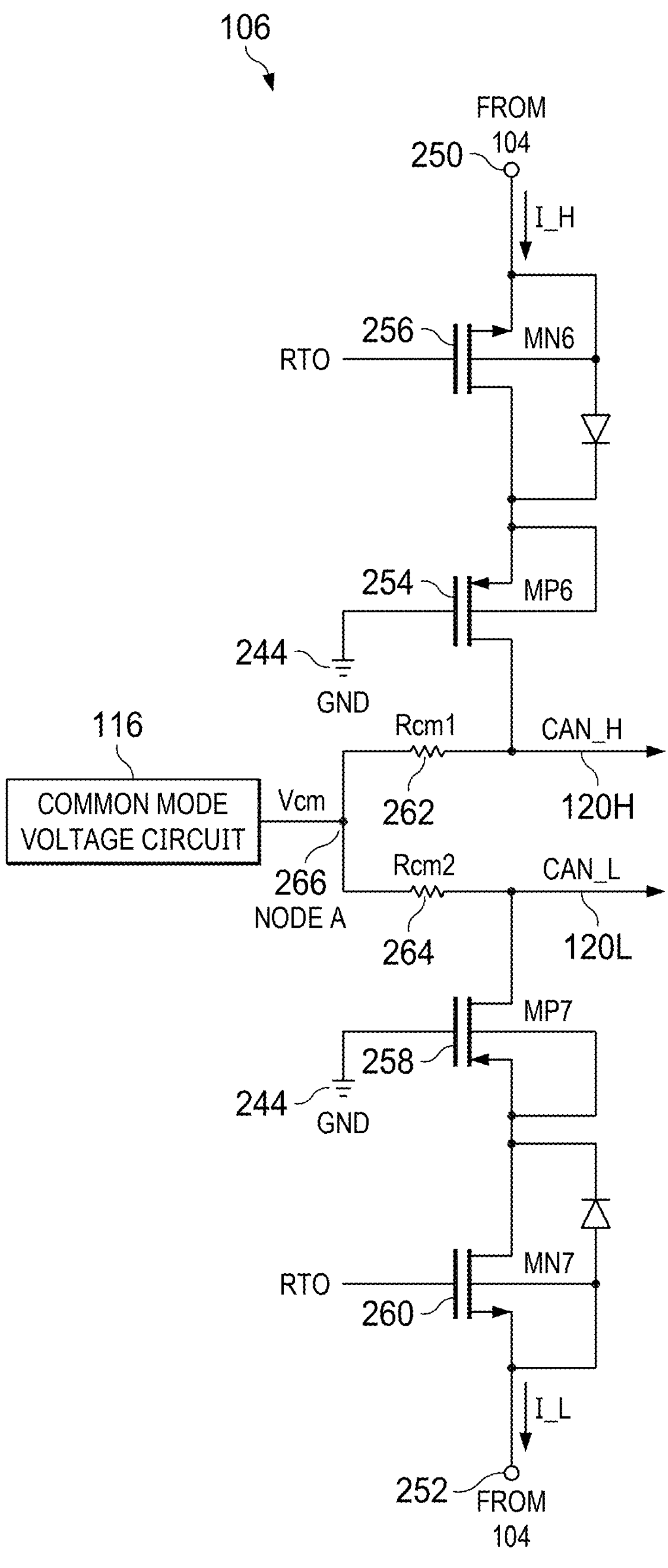
FIG. 2C is a circuit diagram of the output stage of FIG. 1.

FIG. 2C is a circuit diagram of the output stage 106 of FIG. 1. The output stage 106 includes the common mode voltage circuit 116, a sixth p-channel MOSFET (MP6) 254, a sixth n-channel MOSFET (MN6) 256, a seventh p-channel MOSFET (MP7) 258, a seventh n-channel MOSFET (MN7) 260, a first common mode resistor (Rcm1) 262, and a second common mode resistor (Rcm2) 264.

A source of MN6 256 is coupled to a cathode of its bulk diode and the first bus current terminal 250. A drain of MN6 256 is coupled to an anode of its bulk diode, a back-gate (bulk terminal) of MP7 256, and to a source and a back-gate of MP6 254. A gate of MN6 256 receives a bias voltage recessive time-out (RTO). A drain of MP6 254 is coupled to CAN_H 120H and a first terminal of Rcm1 262. A second terminal of Rcm1 262 is coupled to a second terminal of Rcm2 264 and a node A 266. Node A 266 is coupled to a terminal of the common mode voltage circuit 116. A gate of MP6 254 is coupled to the ground terminal 224, so that while MN6 256 is turned on, MP6 254 is also turned on.

A source of MN7 260 is coupled to an anode of its bulk diode, a back-gate of MN7 260, and the second bus current terminal 252. A drain of MN7 260 is coupled to a cathode of its bulk diode, and to a source and a back-gate of MP7 258. A gate of MN7 260 receives bias voltage RTO. A drain of MP7 258 is coupled to CAN_L 120L and a first terminal of Rcm2 264. A gate of MP7 258 is coupled to the ground terminal 224, so that while MN7 260 is turned on, MP7 258 is also turned on. In some examples, MP6 254 helps to block an "off state" reverse leakage current between Vcc 222 and CAN_H 120H if a voltage of CAN_H 120H departs from a designed voltage range. In some examples, MP7 258 helps to block the off state reverse leakage current between the ground node and CAN_L 120L if a voltage of CAN_L 120L departs from a designed voltage range.

The common mode voltage circuit 116 maintains the common mode voltage (Vcm), which equals a voltage corresponding to a REC signal, on CAN_L 120H and CAN_L. When a DATA signal corresponding to a DOM signal is received by the CAN transmitter 100, SWb_H 232 and SWb_L 244 sequentially deactivate, and SW_H 228 and SW_L 240 sequentially activate, so that I_H flows through MP5 226 and I_L flows through MN5 238. I_H pulls the voltage on CAN_H 120H up and I_L symmetrically pulls the voltage on CAN_L 120L down. I_H and I_L pull the voltages on CAN_H 120H and CAN_L 120L (respectively) so that those voltages are symmetric with respect to Vcm, and so that a difference between those voltages corresponds to the DOM signal. As described above, maintaining symmetry of the voltages on CAN_H 120H and CAN_L 120L with respect to Vcm enables reduced EMF emissions by the CAN transmitter 100. The common mode voltage circuit 116 is further described with respect to FIG. 3.

RTO is high (for example, has a high voltage such as Vcc) while the CAN transmitter 100 is actively signaling, accordingly, if a duration between the DATA signal having the DOM value (such as a logic zero value) is less than a threshold duration. Accordingly, if the duration between logic zero DATA signal values is less than the threshold duration, MP6 254, MN6 256, MP7 258, and MN7 260 are turned on. If the DATA signal has the REC value (such as a logic one value) for longer than the threshold duration, then RTO is low (for example, has a low voltage such as a ground or zero voltage) and MP6 254, MN6 256, MN6 258, and MN7 260 are turned off. MP6 254, MN6 256, MP7 258, and MN7 260 are turned off while transmission is inactive to equalize capacitance on CAN_H 120H with capacitance on CAN_L 120L. CAN_H 120H and CAN_L 120L continue to have the common mode voltage, corresponding to a REC signal, while RTO is low.

In some examples, use of the RTO signal to disconnect the CAN bus 120 from the current source circuits 236 and current sink circuits 248 reduces or avoids a capacitance matching design requirement to meet an EMF emission specification. Accordingly, it enables design to avoid a requirement to match MP5 226 capacitances to MN5 238 capacitances in respective turned-off (deactivated) states. In some examples, this enables a reduction in size of MN5 238 transistors, such as a 75% size reduction, accordingly, to 25% of a size corresponding to implementing the capacitance matching requirement.

In some examples, the RTO signal is replaced by coupling the gates of MN6 256 and MN7 260 to Vcc 222.

Figure 3:
FIG. 3 is a circuit diagram of the common mode voltage circuit of FIGS. 1 and 2C.
Figure 3:
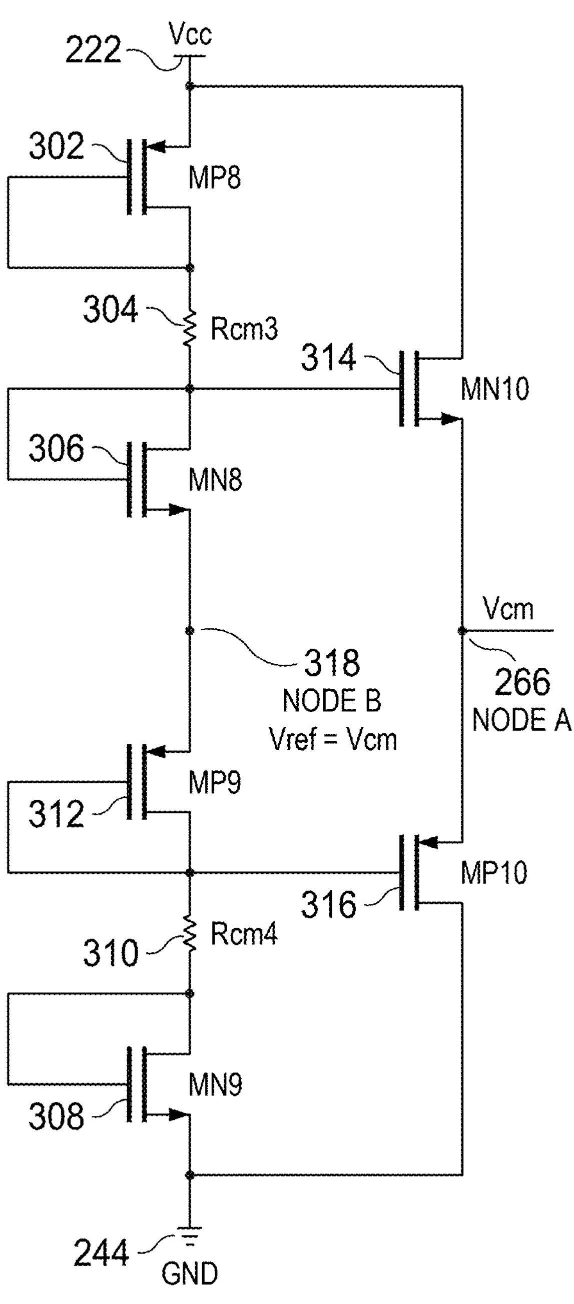

FIG. 3 is a circuit diagram of the common mode voltage circuit 116 of FIGS. 1 and 2C. The common mode voltage circuit 116 includes an eighth p-channel MOSFET (MP8) 302, a third common mode resistor (Rcm3) 304, an eighth n-channel MOSFET (MN8) 306, a ninth n-channel MOSFET (MN9) 308, a fourth common mode resistor (Rcm4) 310, a ninth p-channel MOSFET (MP9) 312, a tenth n-channel MOSFET (MN10) 314, and a tenth p-channel MOSFET (MP10) 316.

A source of MP8 302 and a drain of MN10 314 are coupled to Vcc 222. A gate and a drain of MP8 302 are coupled to a first terminal of Rcm3 304. A second terminal of Rcm3 304 is coupled to a gate and a drain of MN8 306 and a gate of MN10 314. A source of MN8 306 and a source of MP9 312 are coupled to a node B 318. Node B 318 has a reference voltage (Vref). In some examples, Vref equals Vcc/2, or half of a difference between Vcc and the ground voltage. A gate and drain of MP9 312 are coupled to a gate of MP10 316 and a first terminal of Rcm4 310. A second terminal of Rcm4 310 is coupled to a gate and a drain of MN9 308. A source of MN9 308 and a source of MP10 316 are coupled to the ground terminal 224.

MP8 302, MN8 306, MN9 308, and MP9 312 turn on if the difference between Vcc and the ground voltage is greater than the sum of the threshold voltages ($V_T$) of MP8 302, MN8 306, MN9 308, and MP9 312. Use of MP8 302, a p-channel MOSFET coupled to Vcc and MN9, an n-channel MOSFET, coupled to the ground terminal 224 enables the common mode voltage circuit 116 to function. Rcm3 304 and Rcm4 310 prevent high current shoot-through. MN8 306 and MP9 312 enables $V_T$ process variations to balance between node A 318 and Vcc 222 and between node A 318 and the ground terminal 224.

MP8 302, MN8 306, MN9 308, MP9 312, Rcm3 304, and Rcm4 310 are designed so that the voltage Vref at node A 318 equals the designed Vcm. The gate voltages of MN8 306 and MP9 312 control MN10 314, and MP10 316, respectively. MN10 314 and MP10 316 are controlled so that the voltage at node A 266 equals Vref and, accordingly, Vcm. MP8 302, Rcm3 304, and MN8 306 together correspond to a top half of the common mode voltage circuit 116. MN9 308, Rcm4 310, and MP9 312 together correspond to a top half of the common mode voltage circuit 116. The top half passively controls MN10 314, and the bottom half passively controls MP10 316. In some examples, such as when Vcm is designed to equal Vcc/2, these passive controls are symmetric. Symmetric passive control of the top half and bottom half of the common mode voltage circuit 116 enables the top half and the bottom half to have equal equivalent resistances when turned on. Accordingly, the voltage at Node A 264 equals Vcm equals Vcc/2.

Figure 4:
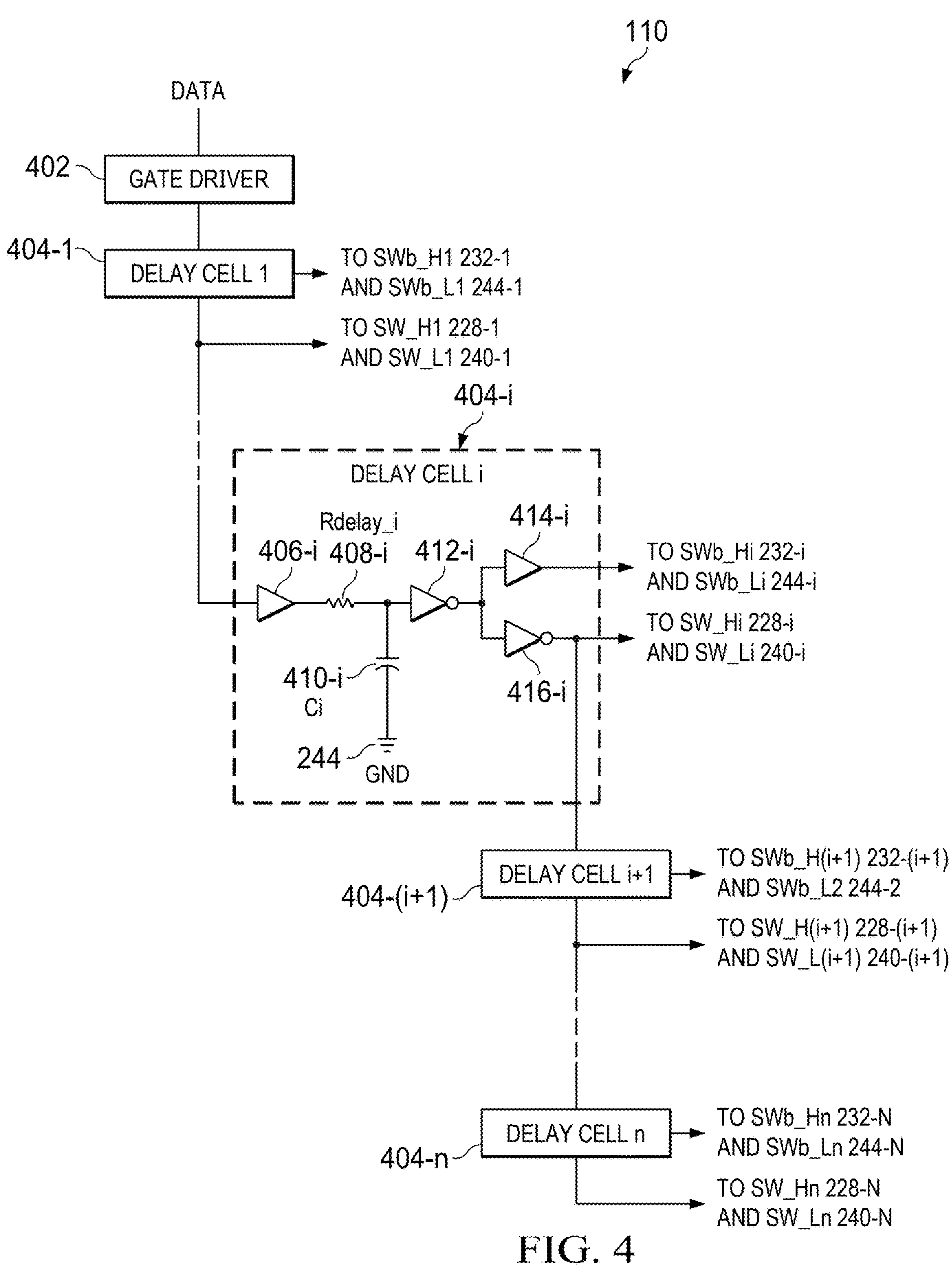
FIG. 4 is a functional block and circuit diagram of the control circuit of FIGS. 1 and 2B.

FIG. 4 is a functional block and circuit diagram of the control circuit 110 of FIGS. 1 and 2B. The control circuit 110 includes a gate driver 402 and N delay circuits, delay circuit 1 404-1 through delay circuit N 404-N. Each delay circuit includes a first buffer 406, a delay resistor Rdelay 408-1 through 408-N, a capacitor C1 410-1 through CN 410-N, a Schmitt trigger 412, a second buffer 414, and an inverter 416. The first buffers 406 are numbered first buffer 1 406-1 through first buffer N 406-N. The Schmitt triggers are numbered Schmitt trigger 1 412-1 through Schmitt trigger N 412-N. The second buffers 414 are numbered second buffer 1 414-1 through second buffer N 414-N. The inverters 416 are numbered inverter 1 416-1 through inverter N 416-N.

An input of the gate driver 402 receives the DATA signal (such as a logic one or logic zero). Responsive to the gate driver 402 input, the CAN transmitter 100 transmits a DOM signal or a REC signal. An output of the gate driver 402 is coupled to an input of delay cell 1 404-1. For i equals 1 through N−1, an inverted output of delay cell i 404-*i* is coupled to control terminals of swb_Hi 232-*i* and swb_Li 244-*i*. A noninverted output of delay cell i 404-*i* is coupled to an input of delay cell (i+1) 404-(i+1), and to control terminals of sw_Hi 228-*i* and sw_Li 240-*i*. For i equals N, an inverted output of delay cell N 404-N is coupled to control terminals of swb_HN 232-N and swb_LN 244-N. A noninverted output of delay cell i 404-*i* is coupled to control terminals of sw_HN 228-N and sw_LN 240-N.

The input of delay cell i 404-*i* is coupled to an input of first buffer i 406-*i*. An output of first buffer i 406-*i* is coupled to a first terminal of resistor Rdelay i 408-*i*. A second terminal of Rdelay i 408-*i* is coupled to a first terminal of capacitor Ci 410-*i* and an input of Schmitt trigger i 412-*i*. An output of Schmitt trigger i 412-*i* is coupled to an input of second buffer i 414-*i* and an input of inverter i 416-*i*. An output of first buffer i 414-*i* is coupled to the inverted output of delay cell i 404-*i*. An output of inverter i 416-*i* is coupled to the noninverted output of delay cell i 404-*i*. In some examples, a Schmitt trigger provides a digital output that is inverted with respect to its input, and that lags changes in its input according to a designed hysteresis. In some examples, use of Schmitt triggers enables the circuit to avoid shoot-through.

The gate driver 402 provides either a first signal or a second signal. Each Ci 410-*i*, and the corresponding Rdelay i 408-*i*, forms an RC circuit that charges or discharges responsive to a (charging) high voltage signal or a (discharging) low voltage signal provided by the gate driver 402 or by the sequentially previous Schmitt trigger (i−1) 412-(i−1). Either the first signal or the second signal is a high voltage signal that controls the various Ci 410-*i* to charge at a rate responsive to an RC time constant corresponding to the respective Ci 410-*i* and Rdelay i 408-*i*. The other signal (either the second signal or the first signal) is a low voltage signal that controls the various Ci 410-*i* to discharge at a rate responsive to the RC time constant corresponding to the respective Ci 410-*i*. Charge and discharge rates are also responsive to the voltage of the signal provided at the input of the respective delay cell i 404-*i* by the gate driver 402 or the sequentially previous Schmitt trigger (i−1) 412-(i−1).

Accordingly, a time between sequentially successive MP5 226 and/or MN5 238 (numbered i−1 and i) turning on is responsive to Schmitt trigger (i−1) 412-(i−1), Rdelay i 408-*i*, and Ci 410-*i*. Similarly, a time between sequentially successive MP5 226 and/or MN5 238 (numbered i+1 and i) turning off is responsive to Schmitt trigger (i+1) 412-(i+1), Rdelay i 408-*i*, and Ci 410-*i*. Turn on of MP5 226 and MN5 238 is performed in sequential order from i equals 1 to N, and turn off of MP5 226 and MN5 238 is performed in sequential order from i equals N to 1. Turn on and turn off of MP5 226 and MN5 238 are further described with respect to FIGS. 5, 6, and 7.

The first signal controls the non-inverted switches SW_Hi 228-*i* and SW_Li 240-*i* to close and controls the inverted switches SWb_Hi 232-*i* and SWb_Li 244-*i* to open. The second signal controls the non-inverted switches SW_Hi 228-*i* and SW_Li 240-*i* to open and controls the inverted switches SWb_Hi 232-*i* and SWb_Li 244-*i* to close.

In an example, when the gate driver 402 provides the first signal, SW_Hi 226-*i* and SW_Li 226-*i* close and SWb_Hi 232-*i* and SWb_Li 244-*i* open sequentially, where i equals 1 to N. The resistances of the various Rdelay-i 408-*i*, the capacitances of the various Ci 410-*i*, and the delays contributed by the various Schmitt triggers i 412-*i* are selected so that when the gate driver 402 provides the first signal, the switches SW_Hi 226-*i* and SW_Li 226-*i* close and SWb_Hi 232-*i* and SWb_Li 244-*i* open with a designed timing.

Similarly, in the example, when the gate driver 402 provides the second signal, SW_Hi 226-*i* and SW_Li 226-*i* open and SWb_Hi 232-*i* and SWb_Li 244-*i* close sequentially, where i equals 1 to N. The resistances of the various Rdelay-i 408-*i*, the capacitances of the various Ci 410-*i*, and the delays contributed by the various Schmitt triggers i 412-*i* are selected so that when the gate driver 402 provides the second signal, the switches SW_Hi 226-*i* and SW_Li 226-*i* open and SWb_Hi 232-*i* and SWb_Li 244-*i* close with a designed timing. In some examples, delay contributed by RC circuits and Schmitt triggers i 412-*i* is sufficiently larger than delay contributed by inverters 416 that delay contributed by inverters 416 can be ignored.

Timing of control signals provided by the control circuit 110 is further described with respect to FIG. 5.

FIG. 5 is a graph 500 of source-gate voltage (Vsg) or gate-source voltage (Vgs) against time for the current sources MP5 226 and current sinks MN5 238 (respectively) of FIG. 2B. A vertical axis corresponds to voltage, and a horizontal axis corresponds to time. Recall that MP5-1 226-1 is turned on at the same time as MN5-1 238-1, MP5-2 226-2 is turned on at the same time as MN5-2 238-2, MP5-3 226-3 is turned on at the same time as MN5-3 238-3, etc. A first Vgs curve (Vgs_1) 502-1 corresponds to Vgs of each of MP5-1 226-1 and MN5-1 238-1, a second Vgs curve (Vgs_2) 502-2 corresponds to Vgs of each of MP5-2 226-2 and MN5-2 238-2, a third Vgs curve (Vgs_3) 502-3 corresponds to Vgs of each of MP5-3 226-3 and MN5-2 238-3, etc.

The graph 500 corresponds to the various MP5 226 and MN5 238 being turned on. Vgs 502 for each of the MP5 226 and MN5 238 starts at zero volts. In some examples, Vgs starts at a value other zero volts that is below a threshold turn-on gate-source voltage (Vth) for each MP5 226 and MN5 238. When an MP5 226 or MN5 238 is fully turned on, current through its corresponding charging resistor Rchg_H 230 or Rchg_L 242 equals zero, and the Vgs of that MP5 226 or MN5 238 equals a designed value Vgs_SET. Vgs_SET for MP5 226 corresponds to or equals a difference between Vcc and BIAS_P. Vgs_SET for MN5 238 corresponds to or equals a difference between the ground voltage and BIAS_N.

At T1, SWb_H1 232-1 opens and SW_H1 228-1 closes, and SWb_L1 244-1 opens and SW_L1 240-1 closes. This causes Vgs_1 502-1 to start to rise, both for MP5-1 226-1 and for MN5-1 238-1. Accordingly, MP5-1 226-1 and MN5-1 238-1 start to turn on at T1.

At T2, SWb_H2 232-2 opens and SW_H1 228-2 closes, and SWb_L2 244-2 opens and SW_L2 240-2 closes. This causes Vgs_2 502-2 to start to rise, both for MP5-2 226-2 and for MN5-2 238-2. Accordingly, MP5-2 226-2 and MN5-1 238-2 start to turn on at T2. Similarly, MP5-3 226-3 and MN5-1 238-3 start to turn on at T3. As described with respect to FIG. 4, there is a designed time T_STAG between T1 and T2. Resistance values of Rdelay i 408-*i*, capacitances of Ci 410-*i*, and delay contributed by Schmitt triggers i 414-*i* are designed so that there is a constant time T_STAG between successive activation state changes of high and low side switches. Accordingly, the time from T2 to T3 equals T_STAG.

MP5-1 226-1 and MN5-1 238-1 finish turning on at T4. The time from T1 to T4, which is the amount of time taken by MP5-1 226-1 and MN5-1 238-1 to turn on, equals Ton_1. An amount of time for MP5-2 226-2 and MN5-2 238-2 to turn on is shorter than Ton_1. As described above, an amount of time taken for each MP5 226 and MN5 238 to turn on is responsive to its gate-source capacitance and its respective Rchg_H 230 or Rchg_L 240. Also, an amount of time taken for each MP5 226 and MN5 238 to turn off is responsive to its gate-source capacitance and its respective Rdschg_H 234 or Rdschg_L 246.

In some examples, shorter turn-on or turn-off time corresponds to faster Vgs change. Longer turn-on or turn-off time corresponds to slower Vgs change. Time taken for successive MP5 226 and MN5 238 to turn on is successively shorter to enable the rate of change of the resistance of the MP5 226 network to be constant, and to enable the rate of change of the resistance of the MN5 238 network to be constant. Similarly, time taken for successive MP5 226 and MN5 238 to turn off is successively longer to enable the rate of change of the resistance of the MP5 226 network to be constant, and to enable the rate of change of the resistance of the MN5 238 network to be constant. Accordingly, MP5-N 226-N and MN5-N 238-N turn-on time Ton_N is the shortest turn-on time.

In some examples, earlier MP5 226 and MN5 238 to turn on (such as i equals 1) initially do so in the saturation region, so that there is a relatively large reduction in resistance over time contributed by that (or those) MP5 226 and MN5 238 while in the saturation region. In some examples, later MP5 226 and MN5 238 to turn on (such as i equals N) initially do so in the linear region, so that there is a relatively small reduction in resistance over time contributed by that (or those) MP5 226 and MN5 238. In some examples, turn-on in saturation region is responsive to relatively high drain-source voltage, and turn-on in linear region is responsive to relatively low drain-source voltage.

A total time taken to turn on all of the MP5 226 and MN5 238 is Tswitch. Tswitch equals a time from T1, when MP5-1 226-1 and MN5-1 238-1 begin to turn on, to T5, when MP5-N 226-N and MN5-N 238-N finish turning on. T_STAG is designed to be less than the individual MP5 226 (or MN5 238) turn-on times Ton_i. Accordingly, Tswitch equals $(N-1)\times T_{STAG}+Ton_N$, which is less than the sum of MP5 226 (or MN5 238) turn-on times (Ton_1 plus Ton_2 plus . . . Ton_N). In an example, Ton_1 equals $4\times T_{STAG}$ and Ton_N equals T_STAG.

Vgs curves for MP5 226 and MN5 238 turn-off (not shown) decrease from Vgs_SET to 0 (or other baseline voltage). As described above, in some examples, turn-off times are different from turn-on times, but are still equal (matched) between corresponding MP5-i 226-*i* and MN5-i 238-*i*. In some examples, Vgs curves for MP5 226 and MN5 238 turn-off are approximately the same (within design constraints) as Vgs curves for MP5 226 and MN5 238 turn-on, but in reversed duration order.

To accomplish this, current sourcing switches MP5-i 226-*i* and current sinking switches MN5-i 238-*i* are turned off in the same sequence that they are turned on (i equals 1, then 2, then 3, etc.). Rdschg_H 234 and Rdschg_L 246 resistance values are selected so that turn-off times are longer first, then progressively shorter. MP5-1 226-1 and MN5-1 238-1 are turned off first, with a turn-off time Toff_1 that equals Ton_N. MP5-1 226-N and MN5-1 238-N are turned off last, with a turn-off time Toff_N that equals Ton_1. Accordingly, Toff_1 equals Ton_N, Toff_2 equals Ton_(N−1), Toff_3 equals Ton_(N−2), etc.

In an example, if all MP5 226 are matched and all MN5 238 are matched, then a resistance of Rdscg_H1 234-1 equals a resistance of Rchg_HN 230-N and a resistance of Rdschg_L1 246-1 equals a resistance of Rchg_HN 242-N. Let R(component) indicate the resistance of the component. Accordingly, Rdschg_Hi 234-*i* equals Rchg_H(N−i+1) 230-(N−i+1) and Rdschg_Li 246-*i* equals Rchg_L(N−i+1) 242-(N−i+1).

Figure 6:
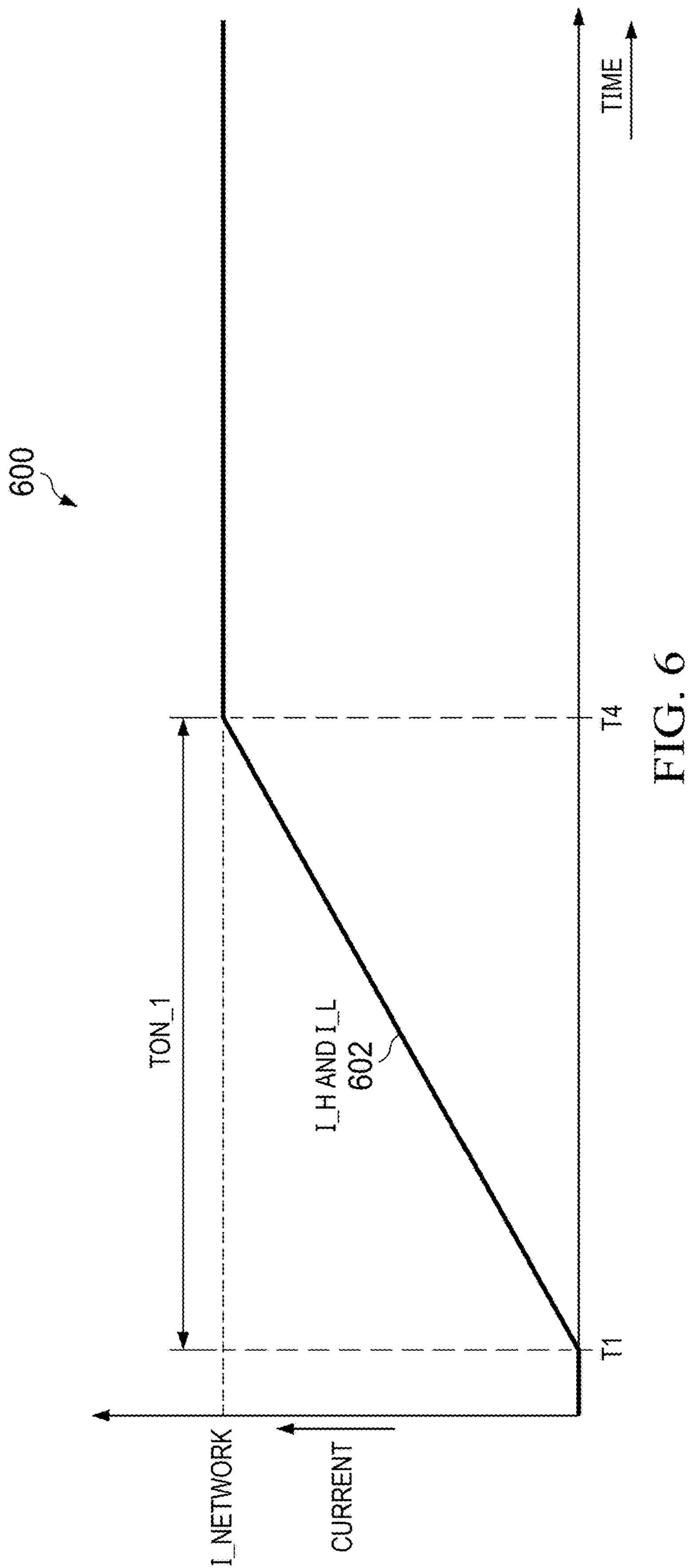
FIG. 6 is a graph of current provided to the high side line of the CAN bus against time for the output control stage of FIG. 1.

FIG. 6 is a graph of current provided to CAN_H 120H against time for the output control stage 104 of FIG. 1. A vertical axis corresponds to current, and a horizontal axis corresponds to time. A total current provided to CAN_H 120H by the MP5 226 network is I_H. A total current provided to CAN_L 120L by the MN5 238 network is I_L. The I_H and I_L curve 602 represents I_H, and it also represents I_L. Accordingly, the I_H and I_L curve 602 represents ideal, equal currents provided to CAN_H 120H and CAN_L 120L during MP5 226 network turn-on and MN5 238 network turn-on (respectively). Improved current matching is enabled by turning on corresponding MP5-i 226-*i* and MN5 238-*i* transistors in a time-staggered sequence at a controlled, linear rate. As described above, controlled, linear turn-on rates are responsive to Rchg_H 230 and Rchg_L 242 and corresponding MP5 226 and MN5 238 gate-source capacitances.

Before the MP5 226 network and the MN5 238 network begin to turn on, I_H and I_L 602 have a baseline (initial) value, such as zero Amperes. I_H and I_L 602 begin to increase when MP5-1 226-1 and MN5-1 238-1 begin to turn on, which corresponds to the control circuit 110 controlling SWb_H1 232-1 and SWb_L1 244-1 to open, and controlling SW_H1 228-1 and SW_L1 240-1 to close. Accordingly, as described above, MP5-1 226-1 and MN5-1 238-1 begin to turn on at T1, when their respective gates are decoupled from Vcc 222 and the ground terminal 224 (respectively), and are coupled to P_BIAS and N_BIAS (respectively). MP5-1 226-1 and MN5-1 238-1 are fully turned on at T4. In some examples, I_H and I_L 602 exceed 90% of a maximum value I_NETWORK at T4, accordingly, after MP5-1 226-1 and MN5-1 238-1 are fully turned on. In some examples, I_H and I_L 602 reach the maximum value I_NETWORK at T5 after all of the switches MP5-i 226-*i* and MN5-i 238-*i* that control provision of current to the CAN bus 120 are fully turned on.

During MP5 226 network and MN5 238 network turn-off, a decreasing I_H and I_L curve 602 is similar to the increasing I_H and I_L curve 602 illustrated in the graph 600 of FIG. 6 with respect to MP5 226 network and MN5 238 network turn-on. The decreasing I_H and I_L curve 602 decreases from I_NETWORK to the baseline value during MP5 226 network and MN5 238 network turn-on.

In some examples, timing of current decrease is different from timing of current increase, corresponding to timing differences between turn-on and turn-off described with respect to FIG. 5. Timing differences are responsive to resistance differences between MP5 226 and MN5 238 gate charging resistors (Rchg_H 230 and Rchg_L 242) and MP5 226 and MN5 238 gate discharging resistors (Rdschg_H 234 and Rdschg_L 246).

Figure 7:
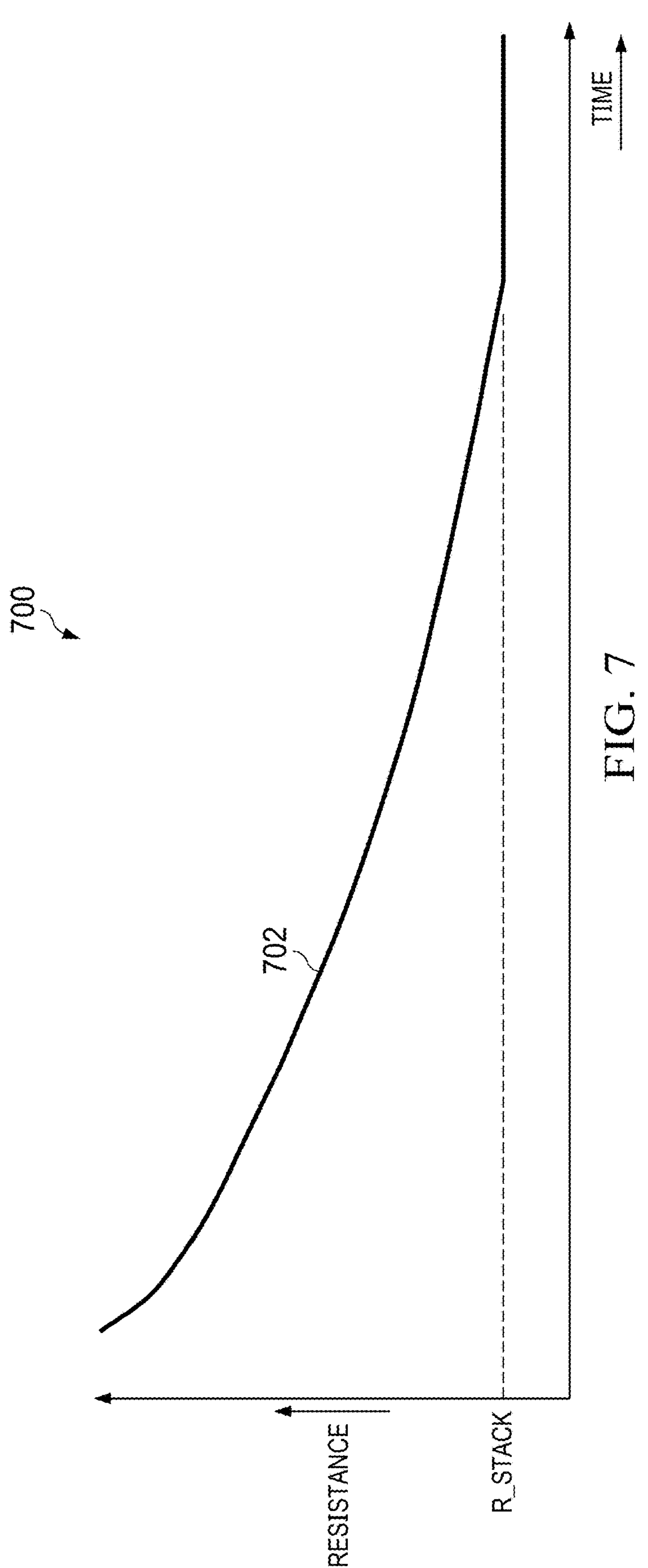
FIG. 7 is a graph of total impedance against time for a current path of the first current source circuit or the second current source circuit of FIG. 1.

FIG. 7 is a graph 700 of total impedance against time for a current path of the first current source block 112 or the second current source block 114 of FIG. 1. A vertical axis corresponds to resistance, and a horizontal axis corresponds to time. As described above, the MP5 226 network and the MN5 238 network are turned on so that a total resistance of the MP5 226 network equals a total resistance of the MN5 238 network during turn-on. Accordingly, a resistance curve 702 corresponds to resistance of the MP5 226 network, and to resistance of the MN5 238 network, during MP5 226 and MN5 238 turn-on. As described above, the resistance curve 702 is approximately linear (such as sufficiently linear to meet design constraints) from T1 (turn-on start) to T5 (turn-on finish) (FIG. 5). At T5, the resistance of the MP5 226 network equals the resistance of the MN5 238 network equals a value R_NETWORK.

In some examples, structures and processes described herein are applicable to differential signaling systems other than CAN systems.

In some examples, a current sink can be described as a negative current source.

In some examples, T_STAG is greater than Ton_N.

In some examples, there is an external 60 Ohm load coupled between CAN_H 120H and CAN_L 120L.

In some examples, delay cells 404 include different components than those described herein.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or IC package) and may be adapted to be coupled to at least some of the passive elements and/or the sources to form the described structure either at a time of manufacture or after a time of manufacture, for example, by an end-user and/or a third-party.

The techniques described in this disclosure may also be embodied or encoded in an article of manufacture including a non-transitory computer-readable storage medium. Example non-transitory computer-readable storage media may include random access memory (RAM), read-only memory (ROM), programmable ROM, erasable programmable ROM, electronically erasable programmable ROM, flash memory, a solid-state drive, a hard disk, magnetic media, optical media, or any other computer readable storage devices or tangible computer readable media. The term "non-transitory" may indicate that the storage medium is not embodied in a carrier wave or a propagated signal. In certain examples, a non-transitory storage medium may store data that can, over time, change (e.g., in RAM or cache).

While the use of particular transistors are described herein, other transistors (or equivalent devices) may be used instead with little or no change to the remaining circuitry. For example, a metal-oxide-silicon FET ("MOSFET") (such as an n-channel MOSFET, nMOSFET, or a p-channel MOSFET, pMOSFET), a bipolar junction transistor (BJT—e.g. NPN or PNP), insulated gate bipolar transistors (IGBTs), and/or junction field effect transistor (JFET) may be used in place of or in conjunction with the devices disclosed herein. The transistors may be depletion mode devices, drain-extended devices, enhancement mode devices, natural transistors or other type of device structure transistors. Furthermore, the devices may be implemented in/over a silicon substrate (Si), a silicon carbide substrate (SiC), a silicon germanium (SiGe) substrate, a gallium nitride substrate (GaN) or a gallium arsenide substrate (GaAs).

Circuits described herein may be reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples may be included in an IC and other elements are external to the IC, in other example embodiments, additional or fewer features may be incorporated into the IC. In addition, some or all of the features illustrated as being external to the IC may be included in the IC and/or some features illustrated as being internal to the IC may be incorporated outside of the IC. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value, or, if the value is zero, a reasonable range of values around zero.

While this disclosure has been described with reference to illustrative embodiments, this description is not limiting. Various modifications and combinations of the illustrative embodiments, as well as other embodiments, will be apparent to persons skilled in the art upon reference to the description.

Modifications are possible in the described examples, and other examples are possible, within the scope of the claims.

What is claimed is:

1. A device comprising:

a bias voltage circuit having a first output and a second output;

an output circuit having first and second inputs and first and second outputs; and multiple current source circuits each respectively having a first input, a second input, and an output, the first inputs of a first plurality of the current source circuits coupled to the first output of the bias voltage circuit, the first inputs of a second plurality of the current source circuits coupled to the second output of the bias voltage circuit, the outputs of the first plurality of the current source circuits coupled to the first input of the output circuit, and the outputs of the second plurality of the current source circuits coupled to the second input of the output circuit, each of the current source circuits including:

a first resistor having first and second terminals, the first terminal of the first resistor coupled to the first input of the current source circuit;

a second resistor having first and second terminals;

a first switch having first and second terminals and a control terminal, the first terminal of the first switch coupled to the second terminal of the first resistor;

a second switch having first and second terminals and a control terminal, the first terminal of the second switch coupled to the second terminal of the second resistor; and a transistor having first and second terminals and a control terminal, the first terminal of the transistor coupled to the first terminal of the second resistor and to the second input of the current source circuit, the second terminal of the transistor coupled to the output of the current source circuit, and the control terminal of the transistor coupled to the second terminal of the first switch and the second terminal of the second switch.

2. The device of claim 1, wherein the first output of the output circuit is responsive to the first input of the output circuit; and wherein the second output of the output circuit is responsive to the second input of the output circuit.

3. The device of claim 1, wherein the transistors are first transistors, and wherein the output circuit includes:

a third resistor having first and second terminals;

a fourth resistor having first and second terminals, the first terminal of the fourth resistor coupled to the first terminal of the third resistor;

a second transistor having first and second terminals and a control terminal, the first terminal of the second transistor coupled to the first input of the output circuit;

a third transistor having first and second terminals and a control terminal, the first terminal of the third transistor coupled to the second terminal of the second transistor, and the second terminal of the third transistor coupled to the second terminal of the third resistor and the first input of the output circuit;

a fourth transistor having first and second terminals and a control terminal, the first terminal of the fourth transistor coupled to the second input of the output circuit; and a fifth transistor having first and second terminals and a control terminal, the first terminal of the fifth transistor coupled to the second terminal of the fourth transistor, and the second terminal of the fifth transistor coupled to the second terminal of the fourth resistor and the second input of the output circuit.

4. The device of claim 1, wherein the output circuit has a third input, the device further comprising a common mode voltage circuit having an output, the output of the common mode voltage circuit coupled to the third input of the output circuit, and the first terminals of the third and fourth resistors coupled to the third input of the output circuit.

5. The device of claim 4, wherein the first output of the output circuit is responsive to the first and third inputs of the output circuit; and wherein the second output of the output circuit is responsive to the second and third inputs of the output circuit.

6. The device of claim 1, wherein the second inputs of the first plurality of the current source circuits are coupled together; and wherein the second inputs of the second plurality of the current source circuits are coupled together.

7. The device of claim 1, further comprising:

multiple delay circuits, each of the delay circuits having an input and first and second outputs, wherein the first output of each of the delay circuits is coupled to a different pair of a control terminal of the first switch of the first plurality of the current source circuits, and a control terminal of the first switch of the second plurality of the current source circuits.

8. The device of claim 7, wherein the second output of each of the delay circuits is coupled to a different pair of a control terminal of the second switch of the first plurality of the current source circuits, and a control terminal of the second switch of the second plurality of the current source circuits.

9. The device of claim 7, wherein each of the delay circuits includes:

a third resistor having first and second terminals, the first terminal of the third resistor coupled to the input of the delay circuit;

a capacitor having first and second terminals; and a Schmitt trigger having an input and an output, the input of the Schmitt trigger coupled to the first terminal of the third resistor and the first output of the delay circuit.

10. The device of claim 9, wherein resistances of the third resistors, capacitances of the capacitors, and delays of the Schmitt triggers are selected so that first switches of the first plurality of current source circuits close sequentially and with an equal delay between sequentially adjacent pairs of first switches.

11. The device of claim 7, wherein the delay circuits are coupled in series.

12. The device of claim 11, further comprising a gate driver having an output coupled to the input of a first one of the delay circuits in the series.

13. The device of claim 1, wherein each transistor of the second plurality of current source circuits has a bulk terminal coupled to the second input of the respective current source circuit.

14. The device of claim 1, wherein the device is a controller area network transmitter.

15. A device comprising:

a bias voltage circuit having a first output and a second output;

a first current source circuit having an input and an output, the input of the first current source circuit coupled to the first output of the bias voltage circuit;

a second current source circuit having an input and an output, the input of the second current source circuit coupled to the second output of the bias voltage circuit;

an output circuit having a first input, a second input, a third input, a first output, and a second output, the first input of the output circuit coupled to the output of the first current source circuit, and the second input of the output circuit coupled to the output of the second current source circuit;

a first transistor having a first terminal, a second terminal, and a control terminal;

a second transistor having a first terminal, a second terminal, and a control terminal;

a third transistor having a first terminal, a second terminal, and a control terminal, the first terminal of the third transistor coupled to the first terminal of the first transistor, and the control terminal of the third transistor coupled to the control terminal and the second terminal of the first transistor and to the control terminal and the first terminal of the second transistor;

a fourth transistor having a first terminal, a second terminal, and a control terminal;

a fifth transistor having a first terminal, a second terminal, and a control terminal, the second terminal of the fifth transistor coupled to the second terminal of the second transistor; and a sixth transistor having a first terminal, a second terminal, and a control terminal, the first terminal of the sixth transistor coupled to the first terminal of the fourth transistor, the second terminal of the sixth transistor coupled to the second terminal of the third transistor and the third input of the output circuit, and the control terminal of the sixth transistor coupled to the control terminal and the second terminal of the fourth transistor and to the control terminal and the first terminal of the fifth transistor.

16. The device of claim 15, further comprising:

a first resistor having first and second terminals, the first terminal of the first resistor coupled to the control terminal and the second terminal of the first transistor, and the second terminal of the first resistor coupled to the control terminal and the first terminal of the second transistor and the control terminal of the third transistor; and a second resistor having first and second terminals, the first terminal of the second resistor coupled to the control terminal and the second terminal of the fourth transistor, and the second terminal of the second resistor coupled to the control terminal and the first terminal of the fifth transistor and the control terminal of the sixth transistor.

17. The device of claim 15, wherein the first transistor and the fifth transistor are p-channel metal-oxide-semiconductor field-effect transistors (MOSFETs); and wherein the second transistor and the fourth transistor are n-channel MOSFETs.

18. The device of claim 17, wherein the third transistor is an n-channel MOSFET; and wherein the sixth transistor is a p-channel MOSFET.

19. The device of claim 15, wherein the first output of the output circuit is responsive to the first and third inputs of the output circuit; and wherein the second output of the output circuit is responsive to the second and third inputs of the output circuit.

20. The device of claim 15, wherein the device is a controller area network transmitter.

* * * * *